US009875292B2

(12) United States Patent
Yurchenko et al.

(10) Patent No.: US 9,875,292 B2
(45) Date of Patent: Jan. 23, 2018

(54) METHOD OF SYNCHRONIZING DATA WITHIN DATABASE CLUSTERS

(71) Applicant: Codership Oy, Helsinki (FI)

(72) Inventors: Alexey Yurchenko, Espoo (FI); Seppo Jaakola, Helsinki (FI); Teemu Ollakka, Oulu (FI)

(73) Assignee: Codership Oy, Helsinki (FI)

( * ) Notice: Subject to any disclaimer, the term of this patent is extended or adjusted under 35 U.S.C. 154(b) by 377 days.

(21) Appl. No.: 13/904,611

(22) Filed: May 29, 2013

(65) Prior Publication Data

US 2014/0358852 A1  Dec. 4, 2014

(51) Int. Cl.
*G06F 7/00* (2006.01)
*G06F 17/30* (2006.01)
*G06F 17/17* (2006.01)

(52) U.S. Cl.
CPC ...... *G06F 17/30581* (2013.01); *G06F 17/175* (2013.01)

(58) Field of Classification Search
CPC .................................................. G06F 17/175
See application file for complete search history.

(56) References Cited

U.S. PATENT DOCUMENTS

| | | | |
|---|---|---|---|
| 2006/0004858 A1* | 1/2006 | Tran et al. | 707/104.1 |
| 2006/0031450 A1 | 2/2006 | Unrau et al. | |
| 2009/0037507 A1* | 2/2009 | Rosman et al. | 708/441 |
| 2011/0302242 A1 | 12/2011 | Kim et al. | |
| 2014/0044015 A1 | 2/2014 | Chen et al. | |
| 2014/0348087 A1 | 11/2014 | Wu et al. | |

* cited by examiner

*Primary Examiner* — Ajith Jacob
(74) *Attorney, Agent, or Firm* — Ziegler IP Law Group, LLC

(57) ABSTRACT

A database cluster is provided. The database cluster includes a plurality of nodes. When a change is implemented at a first given node of the database cluster, the change is communicated to other nodes of the database cluster to synchronize data between the nodes. For this purpose, the first given node generates information by applying a hash function to a database key indicative of where the change is to be implemented. Subsequently, the first given node includes the information generated by the hash function into the change, and communicates the change along with the information to a second given node of the database cluster.

15 Claims, 6 Drawing Sheets

METHOD OF SYNCHRONIZING DATA WITHIN DATABASE CLUSTERS

FIELD OF THE INVENTION

The present invention generally relates to methods of synchronizing databases, and more specifically, to methods of synchronizing data within a plurality of nodes forming a database cluster. Moreover, the present invention relates to database clusters in which data is mutually synchronized. Furthermore, the present invention also relates to software products recorded on non-transitory machine-readable data storage media, wherein the software products are executable upon computing hardware to implement the aforesaid methods.

BACKGROUND OF THE INVENTION

A typical database cluster includes a plurality of database servers that communicate with each other for data replication and data synchronization purposes. Let us consider an example scenario in which a first change is implemented at a first database server. In order to synchronize the first change within the database cluster, the first database server communicates the first change to other database servers within the database cluster. The first change may be communicated using, for example, total order broadcast. Total order broadcast ensures that changes are reliably communicated to all the database servers in an order in which the changes were made.

However, problems may arise in one or more of following cases:
(a) when the database servers are distributed geographically,
(b) when there is heavy load on the database servers and/or one or more communication networks coupling the database servers, and/or
(c) when there is a time lag between communications.

In the example scenario, let us consider that a multi-dimensional database key space is employed at the database cluster. A conflict of synchronization may arise when two or more database servers implement different changes at a substantially similar, similar or preferably same database key of the database key space substantially concurrently. The phrase 'substantially concurrently' may be defined as a scenario where a change A is implemented at a first server and a change B is implemented at a second server, and the timing of both the implementations is such that the first server does not have knowledge of the change B and/or the second server does not have knowledge of the change A.

A conventional technique of resolving conflicts of synchronization and making fault-tolerant database clusters is provided in "The Database State Machine and Group Communication Issues", a thesis by Fernando Pedone (1999) at Ecole Polytechnique Federale de Lausanne. The thesis is incorporated herein by reference in its entirety.

The conventional technique involves navigating through the multi-dimensional database key space to match database keys, and checking whether or not a substantially similar, similar or preferably same database key is involved in different changes substantially concurrently. In addition, the conventional technique employs Optimistic Concurrency Control (OCC).

Continuing from the previous example scenario, OCC may be employed in following steps:
(a) before committing the first change, the database cluster checks whether or not a database server other than the first database server has made a change involving a substantially similar, similar or preferably same database key at which the first database server made the first change; and
(b) if it is found that no database server has made a change involving the substantially similar, similar or preferably same database key, the first change is committed; otherwise, if it is found that another database server has made a change involving the substantially similar, similar or preferably same database key, the first change is discarded.

However, the conventional technique suffers from a number of disadvantages. Firstly, the multi-dimensional database key space has tree topology, and requires a large computational space for storage during operation. Secondly, the database key space related tree topology data are non-trivial to serialize and de-serialize over the communication networks. Thirdly, navigating through the multi-dimensional database key space is computationally expensive. For example, time complexity of the step of navigation may be expressed as '$O(n^2)$' in big O notation. This implies that execution of this step takes quadratic time for completion.

Therefore, there exists a need for a database cluster that is capable of facilitating a significant reduction in complexity of operations performed during synchronization of data within the database cluster.

SUMMARY OF THE INVENTION

The present invention seeks to provide an improved database cluster.

The present invention also seeks to provide an improved method of synchronizing data within a plurality of nodes forming the database cluster.

In one aspect, embodiments of the present invention provide a database cluster including a plurality of nodes. The nodes are mutually coupled in communication, and are operable to exchange data amongst themselves.

Each node of the database cluster may be operable to populate a look-up table with hashed keys, or equivalent form of indexing, generated by applying a hash, or equivalent, function to one or more database keys indicative of where one or more changes have been implemented. The look-up table may be populated substantially in real time, for example, when the changes are implemented.

Consequently, the generation of the hashed keys results in a flattening of a multi-dimensional database key space into a one-dimensional vector represented by the hashed keys. The hashed keys may be in a form of n-byte randomly-distributed integers, where 'n' is any non-zero positive integer.

Accordingly, the hash function may be operable to convert the database keys of the database key space into n-byte randomly-distributed integers. For example, the hash function may be implemented as an 8-byte hash function or 16-byte hash function.

When a change is implemented at a first given node of the database cluster, the change is communicated to other nodes of the database cluster to synchronize data between the nodes. For this purpose, the first given node is operable to generate information by applying the hash function, or equivalent form of function, to a database key indicative of where the change is to be implemented. As mentioned above, the generation of the information by applying the hash function, or equivalent form of function, results in the flattening of the multi-dimensional database key space into the one-dimensional vector represented by the generated information.

Furthermore, the information generated by the hash function is included into the change. Subsequently, the change, including the information, is communicated from the first given node to a second given node of the database cluster.

Upon receiving the change along with the information, the second given node is operable to look-up for the information in its respective look-up table, before implementing the change at the second given node.

In addition, the second given node may be operable to identify whether or not one or more conflicts of synchronization have occurred. A conflict of synchronization may, for example, result from substantially concurrent receipt of changes that bear mutually substantially similar, similar or preferably same information generated by the hash function. If it is found that one or more conflicts of synchronization have occurred, the second given node may be operable to employ Optimistic Concurrency Control (OCC) to resolve the conflicts of synchronization.

Subsequently, the change may be implemented at the second given node. In this manner, data may be synchronized between the first given node and the second given node.

In another aspect, embodiments of the present invention provide a method of synchronizing data within a plurality of nodes forming the database cluster.

In yet another aspect, embodiments of the present invention provide a software product recorded on non-transitory machine-readable data storage media, wherein the software product is executable upon computing hardware for implementing the method of synchronizing data within a plurality of nodes forming the database cluster.

Embodiments of the present invention substantially eliminate the aforementioned problems in the prior art, and facilitate significant reduction in computational space and in complexity of operations performed during synchronization of data within a database cluster.

Additional aspects, advantages, features and objects of the present invention would be made apparent from the drawings and the detailed description of the illustrative embodiments construed in conjunction with the appended claims that follow.

It will be appreciated that features of the present invention are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the disclosure are shown in the drawings. However, the present invention is not limited to specific methods and instrumentalities disclosed herein. Moreover, those in the art will understand that the drawings are not to scale. Wherever possible, like elements have been indicated by identical numbers.

Embodiments of the present invention will now be described, by way of example only, with reference to the following diagrams wherein.

Figure 1:
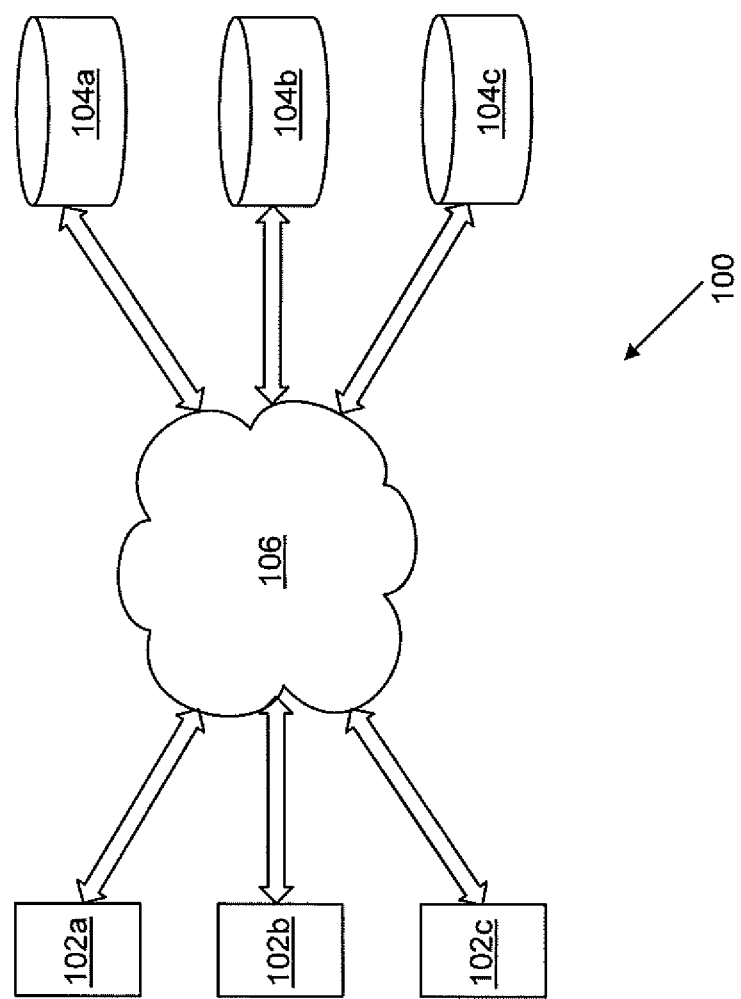
FIG. 1 is a schematic illustration of an example network environment in which a database cluster is implemented pursuant to the present invention.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE INVENTION

The following detailed description illustrates embodiments of the present invention and ways in which it can be implemented. Although the best mode of carrying out the present invention has been disclosed, those in the art would recognize that other embodiments for carrying out or practicing the present invention are also possible.

Embodiments of the present invention provide a database cluster including a plurality of nodes. The nodes are mutually coupled in communication, and are operable to exchange data amongst themselves.

Consider, for example, that an example database key space is employed within the nodes of the database cluster. The database key space may, for example, be a multi-dimensional database key space that includes a plurality of database keys. In one example, each of these database keys may be indicative of one or more columns in one or more column families defined by the database key space, in a non-relational database. In another example, the database key space may be a schema, and each of the database keys may be indicative of one or more rows in one or more tables defined by the schema, in a Relational Database Management System (RDBMS). The terms 'schema' and 'key space' are used interchangeably, throughout this specification and claims. In addition, the terms 'table' and 'column family', and the terms 'row' and 'column' are used interchangeably throughout.

Each node of the database cluster may be operable to populate a look-up table with hashed keys, or equivalent, generated by applying a hash function, or equivalent function, to one or more database keys indicative of where one or more changes have been implemented. The look-up table may be populated substantially in real time, for example, when the changes are implemented.

Consequently, the generation of the hashed keys, or equivalent, results in a flattening of the multi-dimensional database key space into a one-dimensional vector represented by the hashed keys. The hashed keys may be in the form of n-byte randomly-distributed integers, where 'n' is any non-zero positive integer.

Accordingly, the hash function may be operable to convert the database keys of the database key space into n-byte randomly-distributed integers. For example, the hash function may be implemented as an 8-byte hash function or 16-byte hash function.

Beneficially, the hashed keys may have an even distribution over an associated domain of potential values for the hashed keys. In addition, the hash function may be operable to provide a deterministic mapping.

When a change is implemented at a first given node of the database cluster, the change is communicated to other nodes of the database cluster to synchronize data between the nodes. For this purpose, the first given node is operable to generate information by applying the hash function to a database key indicative of where the change is to be implemented. As mentioned above, the generation of the information by applying the hash function results in the flattening of the multi-dimensional database key space into the one-dimensional vector represented by the generated information.

Furthermore, the information generated by the hash function is included into the change. Subsequently, the change, including the information, is communicated from the first given node to a second given node of the database cluster.

Upon receiving the change along with the information, the second given node is operable to look-up for the information in its respective look-up table, before implementing the change at the second given node.

In addition, the second given node may be operable to identify whether or not one or more conflicts of synchronization have occurred. A conflict of synchronization may, for example, result from substantially concurrent receipt of changes that bear mutually same or substantially similar information generated by the hash function. If it is found that one or more conflicts of synchronization have occurred, the second given node may be operable to employ Optimistic Concurrency Control (OCC) to resolve the conflicts of synchronization.

Subsequently, the change may be implemented at the second given node. In this manner, data may be synchronized between the first given node and the second given node.

Referring now to the drawings, particularly by their reference numbers, FIG. 1 is a schematic illustration of an example network environment 100 in which a database cluster is implemented pursuant to the present invention. The network environment 100 includes one or more clients, depicted as a client 102a, a client 102b and a client 102c (hereinafter collectively referred to as clients 102). The network environment 100 also includes a plurality of nodes, depicted as a node 104a, a node 104b and a node 104c (hereinafter collectively referred to as nodes 104). The nodes 104 form the database cluster.

The nodes 104 may, for example, be database servers, processes associated with databases, or computing devices dedicated to running such processes. The nodes 104 may be distributed geographically. Optionally, the nodes 104 may be implemented as a cloud service. In addition, the nodes 104 may be installed at separate hardware or at same hardware.

Furthermore, the network environment 100 also includes a communication network 106 that mutually couples the nodes 104 for exchanging data amongst themselves. The communication network 106 also provides a communication medium between the clients 102 and the nodes 104.

The communication network 106 can be a collection of individual networks, interconnected with each other and functioning as a single large network. Examples of such individual networks include, but are not limited to, Local Area Networks (LANs), Wide Area Networks (WANs), and Metropolitan Area Networks (MANs). Further, such individual networks may be wired, wireless, or a combination thereof.

The clients 102 may be operable to access the nodes 104 via the communication network 106. For example, the clients 102 may be web services that allow users to access the nodes 104. Accordingly, the clients 102 may be operable to perform read and/or write operations on the nodes 104.

It should be noted here that the implementation of the network environment 100 is not limited to a specific type or number of nodes, clients and communication networks. FIG. 1 is merely an example, which should not unduly limit the scope of the claims herein. One of ordinary skill in the art would recognize many variations, alternatives, and modifications of embodiments herein.

Figure 2:
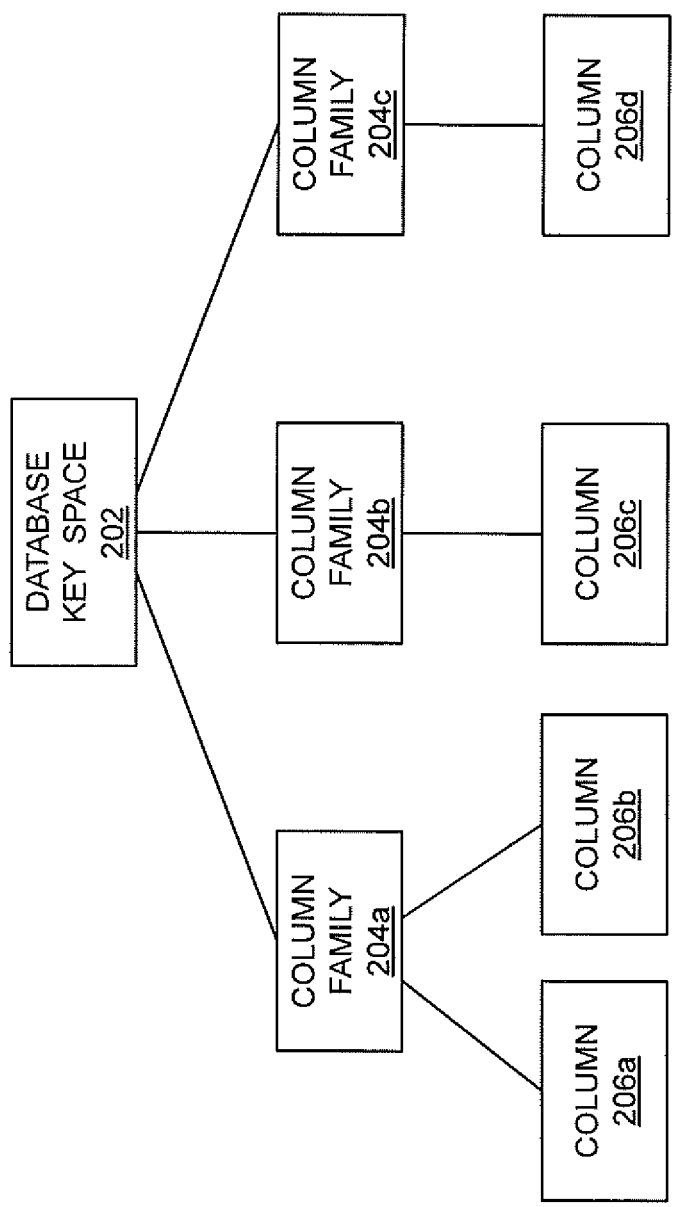
FIG. 2 is an illustration of an example multi-dimensional tree structure of a database key space, in accordance with an embodiment of the present invention.

FIG. 2 is an illustration of an example multi-dimensional tree structure of a database key space 202, in accordance with an embodiment of the present invention. The database key space 202 may, for example, be employed within the nodes 104 of the database cluster. With reference to FIG. 2, the database key space 202 includes one or more column families, depicted as a column family 204a, a column family 204b and a column family 204c. Moreover, the column family 204a includes one or more columns, depicted as a column 206a and a column 206b. The column family 206b includes one or more columns, depicted as a column 206c. The column family 206c includes one or more columns, depicted as a column 206d.

In addition, the database key space 202 includes a plurality of database keys (not shown in FIG. 2). Each of these database keys may be indicative of one or more columns in one or more column families of the database key space 202. Accordingly, the database keys may be of variable lengths. For example, the database keys for the database key space 202 may be represented as follows:

database key space 202
database key space 202: column family 204a
database key space 202: column family 204a: column 206a
database key space 202: column family 204a: column 206b
database key space 202: column family 204b
database key space 202: column family 204b: column 206c
database key space 202: column family 204c
database key space 202: column family 204c: column 206d Here, an expression 'a:b' may, for example, imply that 'b' is included in 'a'.

In accordance with an embodiment of the present invention, each of the nodes 104 is operable to populate a look-up table with hashed keys generated by applying a hash function to one or more database keys indicative of where one or more changes have been implemented.

A given node may populate its respective look-up table substantially in real time, for example, when the given node implements a change. Beneficially, the look-up table may include at least one of:

(a) hashed keys pertaining to a predefined number of recent changes implemented at the given node, and/or
(b) one or more hashed keys pertaining to one or more recent changes implemented at the given node during a predefined period of time.

In order to maintain hierarchical information pertaining to a particular database key indicative of where a particular change has been implemented, the look-up table may also be populated with hashed keys generated by applying the hash function to other database keys related to that particular change. Consider, for example, that the hash function is represented by 'H', and the particular database key is represented as follows:

database key space 202: column family 204a: column 206a

Accordingly, the look-up table may be populated with following:

H(database key space 202)
H(database key space 202: column family 204*a*)
H(database key space 202: column family 204*a*: column 206*a*)

Furthermore, the hashed keys may be in the form of n-byte randomly-distributed integers, where 'n' is any non-zero positive integer. Accordingly, the hash function may be operable to convert database keys into n-byte randomly-distributed integers. For example, the hash function may be implemented as an 8-byte hash function or 16-byte hash function.

In this manner, the hash function may be operable to convert the database keys of variable lengths into the hash keys that have a fixed length. This results in a flattening of the multi-dimensional tree structure of the database key space 202 into a one-dimensional vector represented by the hashed keys, and facilitates significant reduction in computational space. This, in turn, makes the hashed keys trivial to serialize and de-serialize over the communication network 106.

A suitable hash function, or equivalent function, may be selected, so as to decrease a probability of two different database keys generating a substantially similar, similar or preferably same hashed key (hereinafter referred to as a 'collision'). When a hash value collision occurs, it may be a false positive. In a preferred embodiment, it is regarded and treated as a true key match. A true key match, namely a hash key collision, will lead in an embodiment to roll back of the change, namely changes are interpreted as having same database keys. Although reference here is made to a "hash function", it will be appreciated that any other function which is equivalent in effect to such a hash function can be employed for implementing embodiments of the present invention. Based on alternative embodiments, database keys are carried with the information. In case of collision of hash keys, database keys can be further compared to check whether or not the database keys are similar to confirm collision.

It may be noted here that occurrences of false positives are tolerable, if a probability that false positives may occur is low. Otherwise, the probability may be decreased by increasing the length of the hashed keys. Accordingly, a suitable hash function may be selected to make a trade-off between the length of the hashed keys and the probability that collisions may occur. For example, the hash function may be implemented as a 16-byte hash function to lower the probability as compared to an 8-byte hash function.

Beneficially, the hash function may be selected in a way that the hashed keys have an even distribution over an associated domain of potential values for the hashed keys. Such evenly distributed hashed keys are well-suited for look-up tables.

In addition, the hash function may be operable to provide a deterministic mapping, namely, for a given database key, the hash function may generate only one hashed key.

It should be noted here that the implementation of the database key space 202 is not limited to a specific number of column families and columns therein. FIG. 2 is merely an example, which should not unduly limit the scope of the claims herein. One of ordinary skill in the art would recognize many variations, alternatives, and modifications of embodiments herein.

Figure 3A:
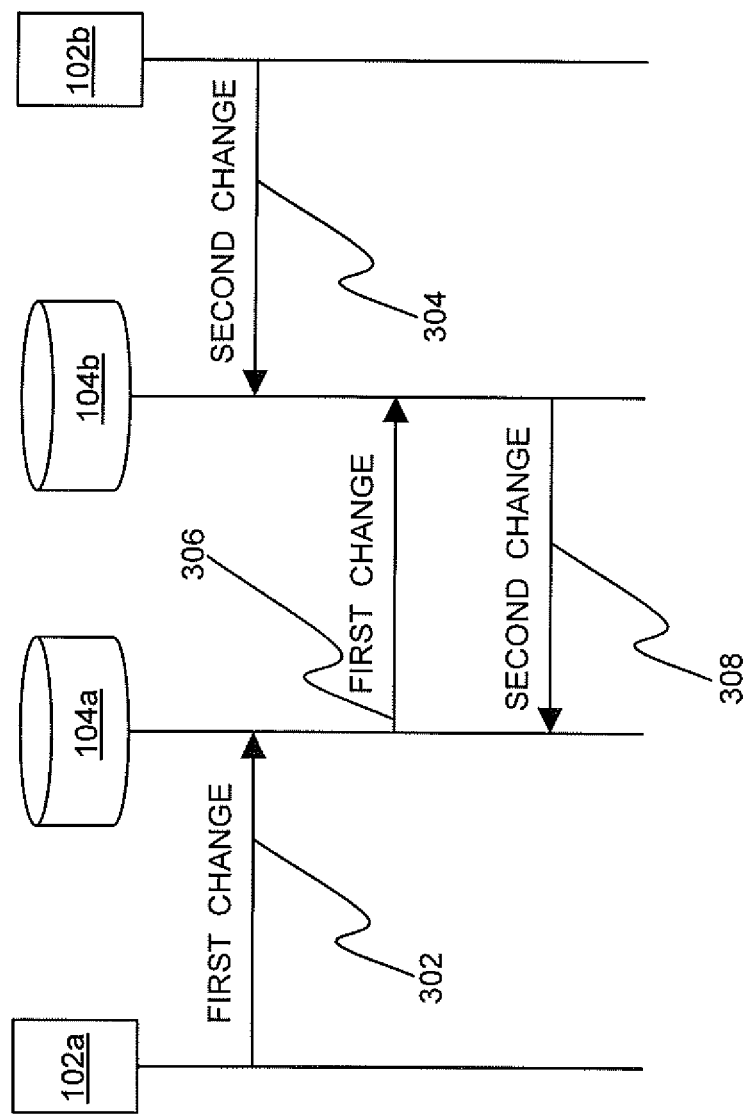
FIGS. 3A and 3B are illustrations of a data flow in an example scenario where changes are synchronized within a plurality of nodes forming the database cluster, in accordance with an embodiment of the present invention.
Figure 3B:
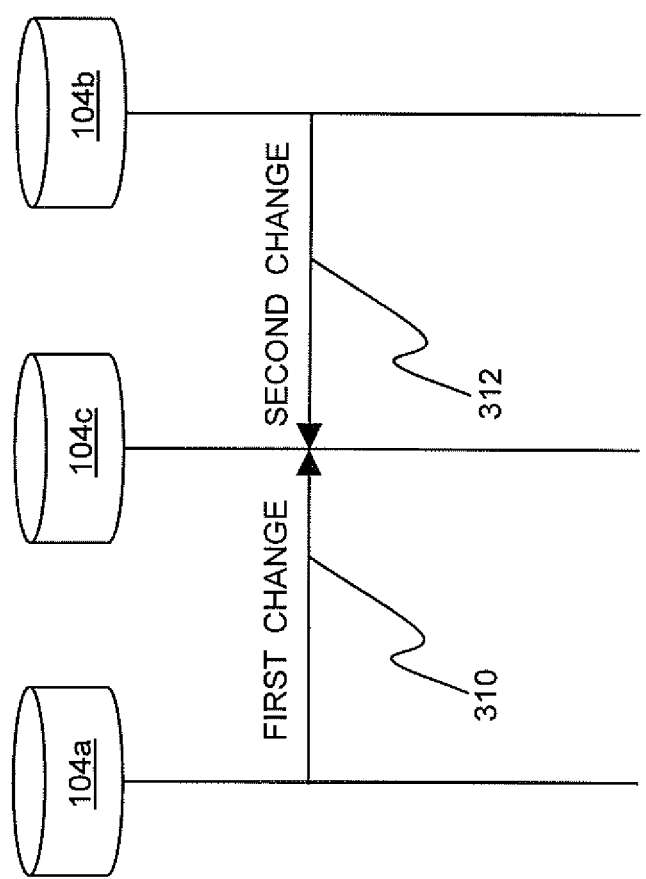

In order to illustrate the implementation of the database cluster, there will be now considered an example scenario with reference to FIGS. 3A and 3B. FIGS. 3A and 3B are illustrations of a data flow in the example scenario where changes are synchronized within the nodes 104, in accordance with an embodiment of the present invention. In the example scenario, it is considered that the client 102*a* implements a first change at the node 104*a*, while the client 102*b* implements a second change at the node 104*b*. In addition, it is considered that the first change and the second change have been implemented substantially concurrently.

The client 102*a* sends data pertaining to the first change to the node 104*a*, as depicted by a data flow arrow 302 in FIG. 3A. Upon receiving the data, the node 104*a* implements the first change at a first database key within its respective database key space.

Similarly, the client 102*b* sends data pertaining to the second change to the node 104*b*, as depicted by a data flow arrow 304 in FIG. 3A. Upon receiving the data, the node 104*b* implements the second change at a second database key within its respective database key space.

In order to synchronize the first change with the node 104*b*, the node 104*a* communicates the first change along with first information to the node 104*b*. For this purpose, the node 104*a* may generate the first information by applying a hash function to the first database key indicative of where the first change is to be implemented. Accordingly, the first information may include a hashed key generated by applying the hash function to the first database key.

Optionally, the first information may include hashed keys generated by applying the hash function to other database keys related to the first change, in order to maintain hierarchical information pertaining to the first database key, as described earlier.

In addition, the first change may include a dataset. The dataset may, for example, include a collection of data to be written and the first database key to which the data is to be written.

Furthermore, the node 104*a* includes the first information into the first change. For example, the first change including the first information may be represented as follows:

| First Information | Dataset |
| --- | --- |
| <H(first database key)> | <first database key> |
| <H(other database keys)> | <data to be written> |

The node 104*a* then sends the first change along with the first information to the node 104*b*, as depicted by a data flow arrow 306 in FIG. 3A.

Similarly, in order to synchronize the second change with the node 104*a*, the node 104*b* communicates the second change along with second information to the node 104*a*. For this purpose, the node 104*b* may generate the second information by applying a hash function to the second database key indicative of where the second change is to be implemented.

Subsequently, the node 104*b* includes the second information into the second change. The second change including the second information may, for example, be represented in a manner that is similar to the representation of the first change including the first information. The node 104*b* then sends the second change along with the second information to the node 104*a*, as depicted by a data flow arrow 308 in FIG. 3A.

Moreover, upon receiving the first change along with the first information, the node 104*b* performs a check to identify whether or not one or more conflicts of synchronization have occurred. For this purpose, the node 104b may look-up for the first information in its respective look-up table.

Beneficially, the look-up table maintained at the node 104b may include at least one of:
(a) hashed keys pertaining to a predefined number of recent changes implemented at the node 104b, and/or
(b) one or more hashed keys pertaining to one or more recent changes implemented at the node 104b during a predefined period of time.

Consider, for example, that the look-up table includes one or more hashed keys generated by applying the hash function to the second database key and/or other database keys related to the second change, which is a most recent change implemented at the node 104b.

If the node 104b finds that the first information is not similar to any hashed key stored in the look-up table, the node 104b identifies that no conflict of synchronization has occurred. In case of no conflicts, a commit of database changes is carried out.

If the node 104b finds that the first information is substantially similar, similar or preferably same to a hashed key stored in the look-up table, the node 104b may further check whether or not a a possible collision has occurred. For this purpose, the node 104b may compare the first database key with one or more database keys to which the hashed key pertains. If the first database key is not substantially similar, similar or preferably same to any of these database keys, the node 104b identifies that no conflict of synchronization has occurred. In a preferred embodiment, if the node 104b finds that the first information is similar or same to a hashed key stored in the look-up table, the node 104b identifies that a conflict has occurred and no commit to database change is approved.

Otherwise, if the first database key is similar or preferably same to any of these database keys, the node 104b identifies that one or more conflicts of synchronization have occurred.

In a case where the node 104b identifies that one or more conflicts of synchronization have occurred, the node 104b may resolve the conflicts of synchronization, for example, by employing Optimistic Concurrency Control (OCC). Accordingly, the node 104b may either discard the first change or perform other suitable options predefined in the database cluster.

In a case where the node 104b identifies that no conflict of synchronization has occurred, the node 104b may implement the first change at the first database key within its respective database key space. In addition, the node 104b may populate its respective look-up table with one or more hashed keys pertaining to the first change. Implementing of change to database can be referred as committing the change.

Meanwhile, upon receiving the second change along with the second information, the node 104a performs a check to identify whether or not one or more conflicts of synchronization have occurred. If it is found that one or more conflicts of synchronization have occurred, the node 104a may resolve the conflicts of synchronization, as described earlier.

If it is found that no conflict of synchronization has occurred, the node 104a may implement the second change at the second database key within its respective database key space. In addition, the node 104a may populate its respective look-up table with one or more hashed keys pertaining to the second change.

Furthermore, the node 104a sends the first change along with the first information to the node 104c, as depicted by a data flow arrow 310 in FIG. 3B. The node 104b sends the second change along with the second information to the node 104c, as depicted by a data flow arrow 312 in FIG. 3B.

Upon receiving the first change and the second change along with the first information and the second information, respectively, the node 104c performs a check to identify whether or not one or more conflicts of synchronization have occurred. As described earlier, one or more conflicts of synchronization may result from substantially concurrent receipt of the first change and the second change, if the first information and the second information are mutually similar.

If it is found that one or more conflicts of synchronization have occurred, the node 104c may resolve the conflicts of synchronization, as described earlier.

If it is found that no conflict of synchronization has occurred, the node 104c may implement the first change at the first database key and the second change at the second database key within its respective database key space. In addition, the node 104c may populate its respective look-up table with hashed keys pertaining to the first change and the second change.

In this manner, data may be synchronized between the nodes 104a, 104b and 104c.

It should be noted here that the implementation of the database cluster is not limited to a specific number of nodes. FIGS. 3A and 3B are merely examples, which should not unduly limit the scope of the claims herein. One of ordinary skill in the art would recognize many variations, alternatives, and modifications of embodiments herein.

Figure 4A:
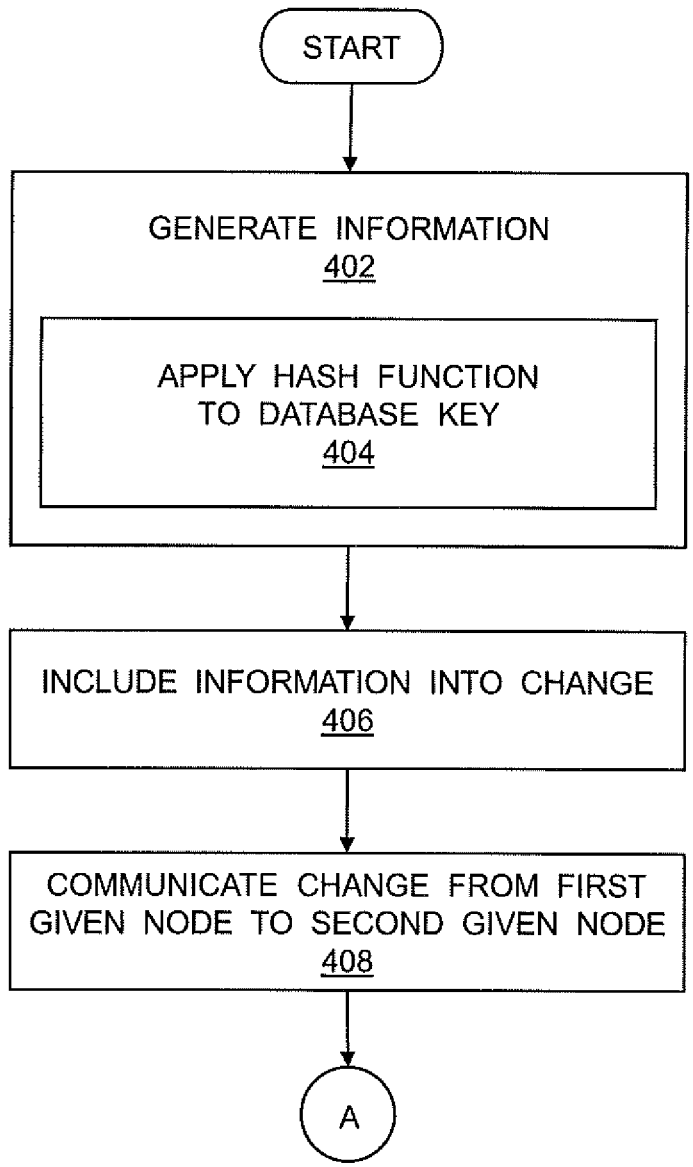
FIGS. 4A and 4B are illustrations of steps of a method of synchronizing data within the plurality of nodes, in accordance with an embodiment of the present invention.
Figure 4B:
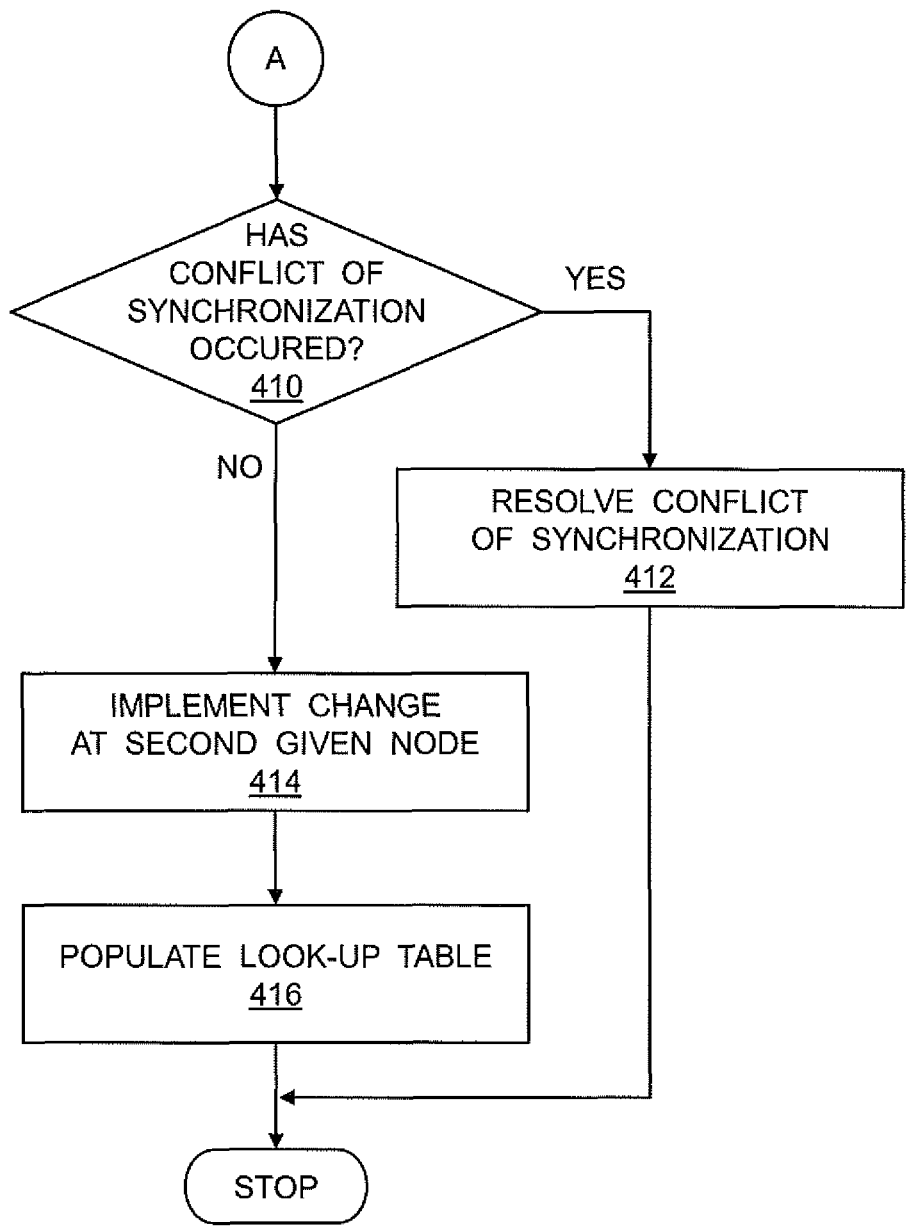

FIGS. 4A and 4B are illustrations of steps of a method of synchronizing data within the nodes 104, in accordance with an embodiment of the present invention. The method is depicted as a collection of steps in a logical flow diagram, which represents a sequence of steps that can be implemented in hardware, software, or a combination thereof.

A situation is herewith considered, for example, wherein a multi-dimensional database key space is employed within the nodes 104 of the database cluster. Moreover, a situation is herewith considered wherein each of the nodes 104 maintains a look-up table, which is populated with hashed keys generated by applying a hash function to one or more database keys indicative of where one or more changes have been implemented. As described earlier, the look-up table may be populated substantially in real time, for example, when the changes are implemented. The generation of the hashed keys results in a flattening of the multi-dimensional database key space into a one-dimensional vector represented by the hashed keys.

Further, a situation is herewith considered wherein a change is implemented at a first given node from amongst the nodes 104. At a step 402, the first given node operates to generate information pertaining to the change. The step 402 includes a step 404.

At the step 404, the first given node operates to apply the hash function to a database key indicative of where the change is to be implemented. Accordingly, the information includes a hashed key generated by applying the hash function to the database key.

Next, at a step 406, the first given node operates to include the information into the change.

Subsequently, at a step 408, the first given node operates to communicate the change along with the information to a second given node from amongst the nodes 104.

Upon receiving the change including the information from the first given node, the second given node operates to perform a step 410. At the step 410, the second given node operates to check whether or not one or more conflicts of synchronization have occurred, as described earlier. In accordance with the step 410, the second given node may look-up for the first information in its respective look-up table.

It should be noted here that a complexity of operations performed in the step 410 is significantly reduced, due to the flattening of the multi-dimensional database key space into the one-dimensional vector.

If, at the step 410, it is found that one or more conflicts of synchronization have occurred, a step 412 is performed. Otherwise, if it is found that no conflict of synchronization has occurred, a step 414 is performed.

At the step 412, the second given node operates to resolve the conflicts of synchronization. In accordance with the step 412, the second given node may employ OCC to resolve the conflicts of synchronization, as described earlier. For example, the second given node may either discard the change or perform other suitable options predefined in the database cluster.

At the step 414, the second given node operates to implement the change at the database key within its respective database key space. The second given node may then acknowledge the implementation of the change to the first given node.

Subsequently, at a step 416, the first given node and the second given node populate their respective look-up tables with one or more hashed keys pertaining to the change implemented at the step 414.

Additionally, the method may include one or more steps at which the first given node operates to communicate the change including the information to other nodes from amongst the nodes 104. Subsequently, the other nodes may operate to perform the steps 410 to 416. In this manner, data is synchronized within the nodes 104.

It should be noted here that the steps 402 to 416 are only illustrative and other alternatives can also be provided where one or more steps are added, one or more steps are removed, or one or more steps are provided in a different sequence without departing from the scope of the claims herein.

As described earlier, the use of hashed keys at the step 410 significantly reduces complexity of operations performed in the step 410. For example, time complexity of the step 410 may be expressed as 'O(n)' in big O notation. This implies that the step 410 takes linear time for completion. In other words, a time taken by the step 410 increases linearly with a size of input provided at the step 410.

In addition, the utilization of the hashed keys also results in significant saving in terms of computational space and expense.

In this manner, embodiments of the present invention can be used for various purposes, including, though not limited to, facilitating significant reduction in computational space and in complexity of operations performed during synchronization of data within a database cluster.

Based on example embodiments, there is an existing database system which uses an algorithm to detect transaction conflicts in the multi-master cluster. An example of such an algorithm can be one presented by OCC or such as presented by Pedone ("The Database State Machine and Group Communication Issues", a thesis by Fernando Pedone (1999) at Ecole Polytechnique Federale de Lausanne). The algorithm optionally relies on comparing keys that uniquely identify changed data. Since keys have tree topology and are non-trival to serialize over network, these are computationally expensive to compare. Based on embodiments, the keys used in the algorithm are substituted with their hash values, "hashed keys" for short. Based on embodiments, the hashed keys are selected to be short and of fixed length, which makes it computationally cost efficient to serialize hashed keys over the network. Since the hashed keys are more or less evenly distributed, these are ideally suited for look-up tables, wherein the hash of the hashed key is the hashed key itself, so no additional hash calculation is needed. False positives caused by possible hash collisions are tolerable, since they do not violate database consistency as the algorithm remains deterministic, and in some implementations clients can tolerate some errors on commits. The embodiments however reduce likelihood of errors on commits dramatically. In addition, false positives can be reduced to virtually improbable by increasing the size of the hashed key. (false positive probability is inversely exponentially proportional to hashed key size: $2^{(-n)}$ where n is the number of bits).

Modifications to embodiments of the present invention described in the foregoing are possible without departing from the scope of the present invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

What is claimed is:

1. A method of synchronizing data within a plurality of computing devices forming a database cluster, wherein the method includes:
   (a) generating information by applying a function to a database key indicative of where a change is to be implemented in a database of the database cluster, wherein applying the function flattens a multi-dimensional structure of a database key space of the database from a tree graph structure into a one-dimensional series of randomly distributed integers represented by the generated information,
   (b) including the information into the change; and
   (c) communicating the change, including the information, from a first computing device of the cluster to a second computing device of the cluster.

2. A method as claimed in claim 1, wherein the method includes populating a look-up table with hashed keys generated by applying the function to one or more database keys indicative of where one or more changes have been implemented.

3. A method as claimed in claim 2, wherein the look-up table is populated substantially in real time.

4. A method as claimed in claim 2, wherein the method includes looking-up the information in the look-up table of the second computing device, before implementing the change at the second computing device.

5. A method as claimed in claim 2, wherein the hashed keys have an even distribution over an associated domain of potential values for the hashed keys, and the function provides a deterministic mapping.

6. A method as claimed in claim 1, wherein the function is implemented as an 8-byte or 16-byte hash function.

7. A method as claimed in claim 1, wherein the method includes employing Optimistic Concurrency Control (OCC) to resolve conflicts of synchronization resulting from substantially concurrent receipt of changes bearing mutually similar information generated by the hash function.

8. A software product recorded on non-transitory machine-readable data storage media, wherein the software product is executable upon computing hardware for implementing a method as claimed in claim 1.

9. A database cluster including a plurality of computing devices, wherein data synchronization occurs between the computing devices, wherein:
(a) information is generated in operation by applying a function to a database key indicative of where a change is to be implemented, wherein the generation of information by applying the function flattens a multi-dimensional structure of a database key space from a tree graph structure into a one-dimensional series of randomly distributed integers represented by the generated information,
(b) the generated information is included into the change; and
(c) the change, including the information, is communicated from a first computing device of the database cluster to a second computing device of the database cluster.

10. A database cluster as claimed in claim 9, wherein each node of the plurality of computing devices is operable to populate a look-up table with hashed keys generated by applying the function to one or more database keys indicative of where one or more changes have been implemented.

11. A database cluster as claimed in claim 10, wherein the look-up table is populated substantially in real time.

12. A database cluster as claimed in claim 10, wherein the second computing device is operable to look-up for the information in its respective look-up table, before implementing the change at the second computing device.

13. A database cluster as claimed in claim 10, wherein the hashed keys have an even distribution over an associated domain of potential values for the hashed keys, and the function provides a deterministic mapping.

14. A database cluster as claimed in claim 9, wherein the function is implemented as an 8-byte or 16-byte hash function.

15. A database cluster as claimed in claim 9, wherein the database cluster is operable to employ Optimistic Concurrency Control (OCC) to resolve conflicts of synchronization resulting from substantially concurrent receipt of changes bearing mutually similar information generated by the function.

* * * * *